United States Patent [19]
Nishikawa et al.

[11] Patent Number: 5,148,284
[45] Date of Patent: Sep. 15, 1992

[54] DATA RECOVERY DEVICE FOR PRINTER

[75] Inventors: Tomoyuki Nishikawa, Matsudo; Masahiro Kita, Tokyo; Takaaki Yano, Kawagoe; Tatsuya Yoshida, Shimooshi; Ryoji Honda, Hizaori; Kiyoshi Negishi, Tsurugashima; Tsutomu Sato, Tokyo; Shoji Kamasako, Tsurugashima, all of Japan

[73] Assignee: Asahi Kogaku Kogyo Kabushiki Kaisha, Tokyo, Japan

[21] Appl. No.: 611,548

[22] Filed: Nov. 13, 1990

[30] Foreign Application Priority Data
Nov. 10, 1989 [JP] Japan .................. 1-293712
Apr. 11, 1990 [JP] Japan .................. 2-98225

[51] Int. Cl.⁵ .................. H04N 1/32; H04N 1/23; H04N 1/21
[52] U.S. Cl. .................. 358/296; 358/437; 358/444
[58] Field of Search .................. 358/296, 300, 304, 437, 358/403, 401, 404, 406, 444; 355/203-209, 316

[56] References Cited

U.S. PATENT DOCUMENTS 4,163,897  8/1979  Hubbard .................. 355/207
4,571,069  2/1986  Kimura .................. 355/206

Primary Examiner—Benjamin R. Fuller
Assistant Examiner—Scott A. Rogers
Attorney, Agent, or Firm—Sandler, Greenblum & Bernstein

[57] ABSTRACT

A data recovery device is employed in a printer using a continuous form recording medium for reprinting data after printing has been interrupted. In the data recovery device, the number of pages remaining in a predetermined area of the feed path of the recording medium is counted. A plurality of page buffers are sequentially read out and printed. The printing operation is controlled such that the one of the data storing means from which the data is read out and printed by the printing means is identified based on the number of the pages remaining in the predetermined area.

11 Claims, 11 Drawing Sheets

FIG. II

DATA RECOVERY DEVICE FOR PRINTER

BACKGROUND OF THE INVENTION

The present invention relates to a data recovery device for reprinting data that has not been printed on recording paper due to a paper jam or the like in a printer.

A laser printer is generally provided with a data recovery function for reprinting pages that have not been printed when recording paper becomes unusable in the course of printing because of paper jamming and the like.

In a printer using a cut sheet, sheets of recording paper are independent of each other and consequently it is only necessary to reprint the page that has suffered from a jam.

In the case of a printer using a continuous form recording sheet, however, the preceding and the following page may also suffer when a paper jam occurs and those pages may also become unusable. As a result, unlike the printer using a cut sheet, which is designed to recover data on only one page, in case of the printer using a continuous recording sheet, recovering data on only one page may be insufficient.

In order to completely reproduce the data thus unprinted because of a jam, the maximum number of pages which may be affected by the jam in the printer could always be recovered. However, the maximum number of pages could not necessarily be recovered, depending on the position to which the paper has been fed. In this case, those pages that have been unaffected by the jam may be reprinted and this inconveniently results in wasting paper.

SUMMARY OF THE INVENTION

It is therefore an object of the invention to provide an improved data recovery device for a printer using a continuous form recording sheet which is capable of eliminating waste of recording paper.

For the above object, according to the invention, there is provided a data recovery device employed in a printer using a continuous form recording medium for reprinting data after printing has been interrupted to The recovery device includes a counting mechanism for counting the number of printed pages remaining in a predetermined area of the feed path of the recording medium, and a plurality of data storing devices for storing printing data on a page basis, the number of the plurality of data storing devices being larger than at least the maximum value of the number of pages capable of remaining in the printer.

A printing device for sequentially reading the data stored in the data storing devices and printing the data onto corresponding pages of the recording medium, and a control mechanism for restarting sequentially printing the data from the data stored in one of the data storing means which is identified based on the number of the pages counted by the counting means after printing performed by the printing devices has been are also provided.

According to another aspect of the invention, there is provided a printer using a continuous form recording medium comprising a data recovery device for reprinting data after printing has been interrupted, The device includes a counting mechanism for counting the number of printed pages of the recording medium remaining in a predetermined area of the feed path of the recording medium, and a plurality of data storing devices for storing printing data on a page basis, the number of the plurality of data storing devices larger than at least the maximum value of the number of pages capable of remaining in the printer.

Also provided is a printing mechanism for sequentially reading the data stored in the data storing devices and printing the data onto corresponding pages of the recording medium 1, a detection mechanism for detecting an error condition of printing operation of the printer and a control mechanism for restarting sequentially printing the data from the data stored in one of the data storing devices which is identified based on the number of the pages counted by the counting mechanism when the error condition is detected by the detection mechanism.

DESCRIPTION OF THE ACCOMPANYING DRAWINGS

Figure 13:
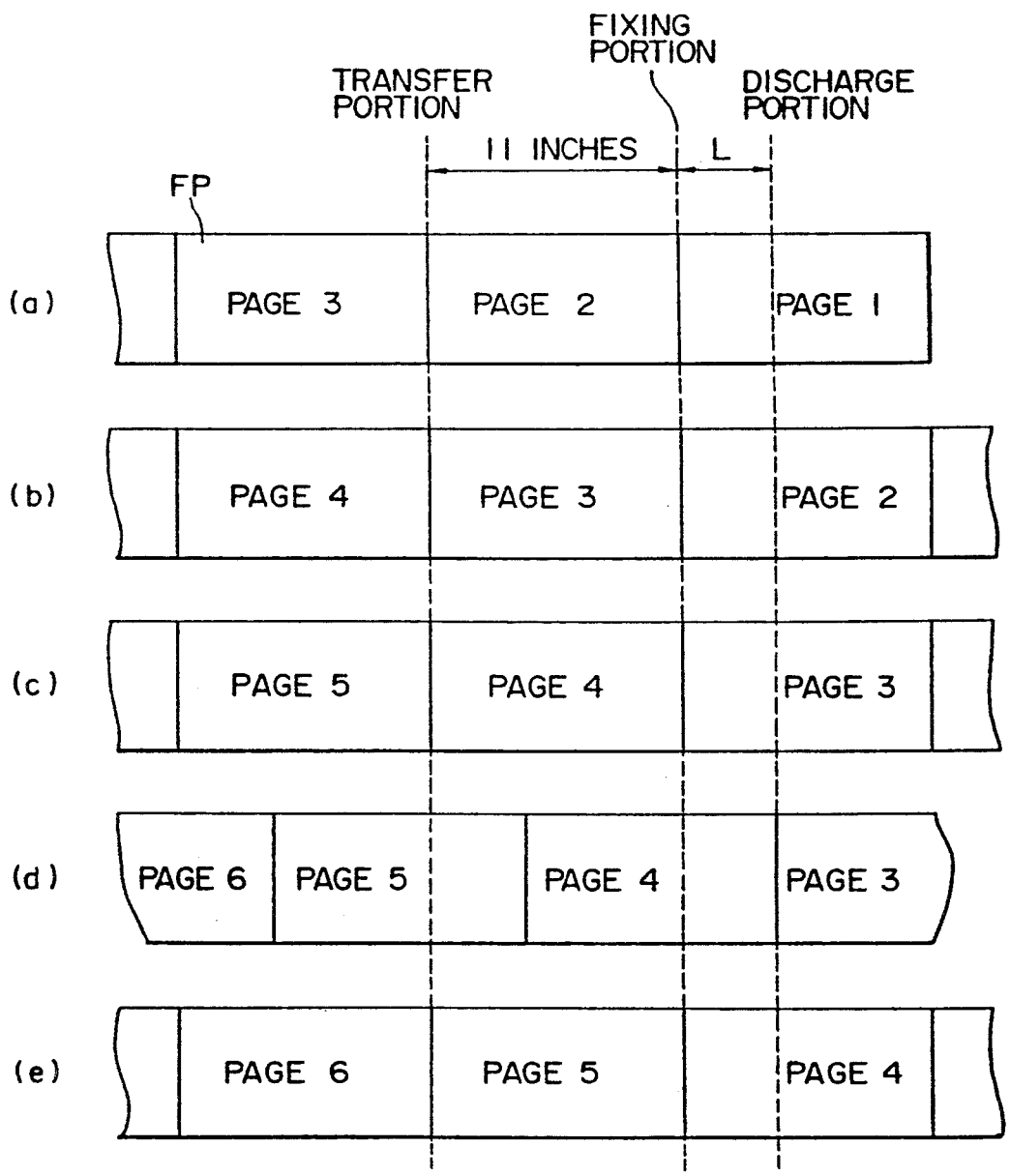
Figure 14:
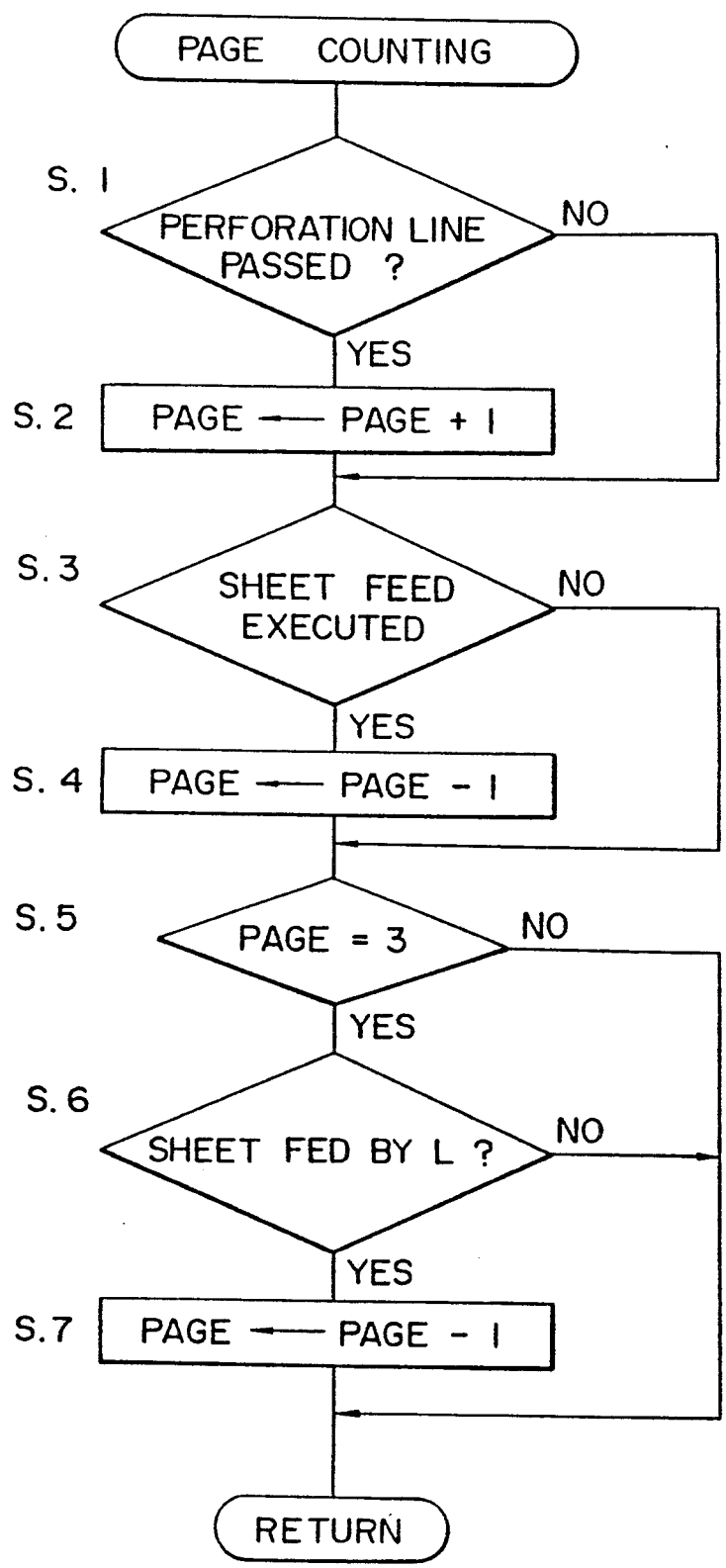

FIGS. 13(a) through 13(e) are diagrams illustrating the states in which recording sheet is fed in the printer; and FIG. 14 is a flowchart illustrating the determination of a page count data.

DESCRIPTION OF THE EMBODIMENTS

Figure 1:
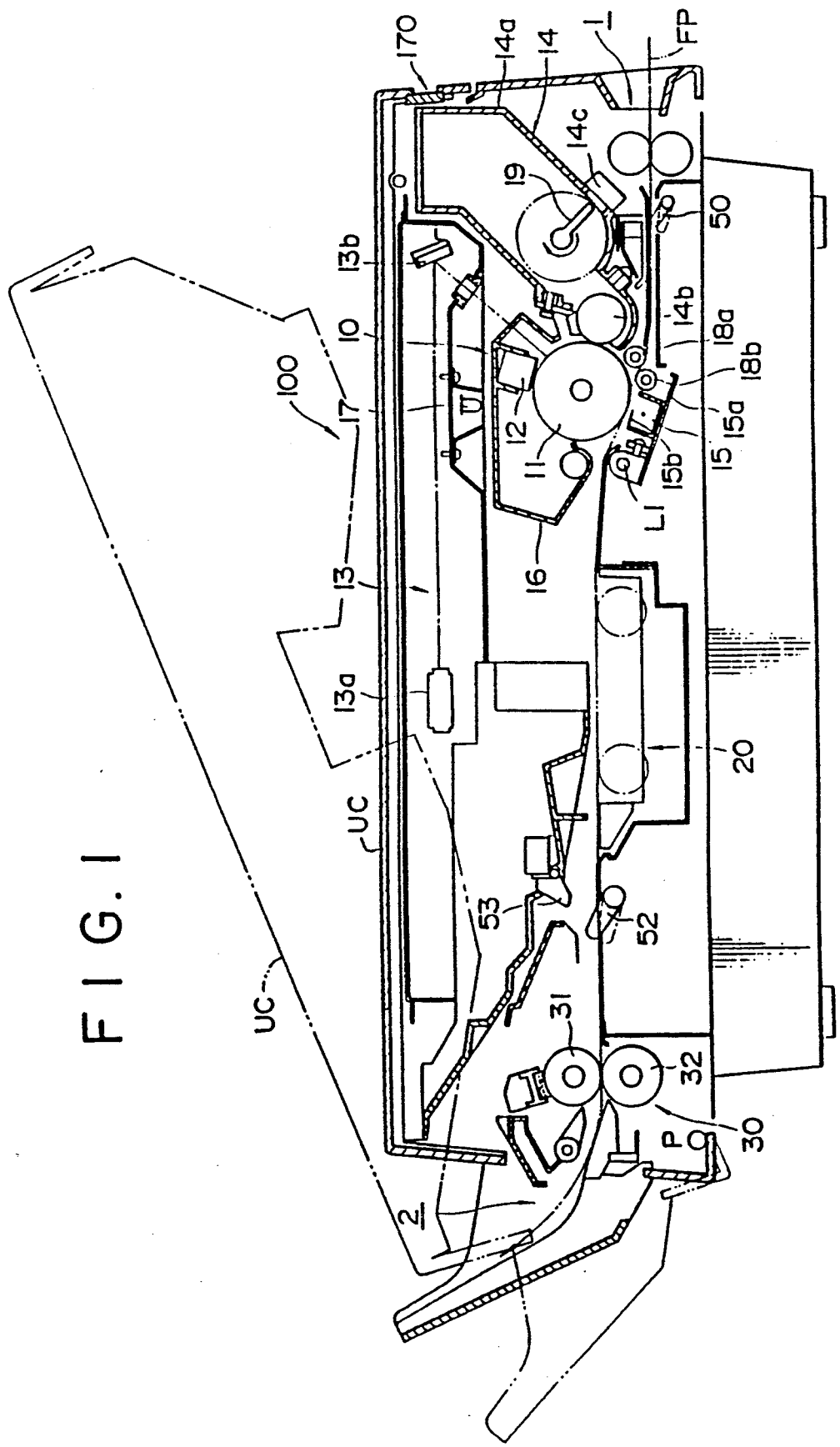
FIG. 1 is a schematic sectional view of a printer having a data recovery device embodying the present invention.

A printer 100 shown in FIG. 1 is a laser beam printer employing an electrophotographic image transfer system. The printer 100 comprises, in sequence, a transfer unit 10 including a photoconductive drum 11, a tractor unit 20 having an endless belt 21 for feeding a recording sheet, and a fixing unit 30 having a pair of rollers 31, 32 for heating and pressing an unfixed toner image, in order to fix it on the recording sheet. Light carrying printing data from a host computer or the like is emitted from a laser scanning unit (LSU) 13, the charged circumferential surface of a photoconductive drum 11 is exposed to the light, and a latent image is formed on the circumferential surface of the photoconductive drum 11. Toner is adhered to the circumferential surface of the photoconductive drum 11 to develop a toner image by use of a developing unit 14. Then the toner image is transferred onto the recording sheet at a transfer charger 15, and the image thus transferred is fixed by a fixing unit 30. The printer 100 employs the electrophotograhic image transfer system, and so it is designed to be a page printer which starts printing after the printing data for one page is accumulated. The laser scanning unit 13 is secured to an upper cover UC. The upper cover UC is rotatably disposed on the main body of the printer 100 so that it can be rocked around a pivot axis P.

This printer 100 uses a continuous form recording sheet FP, which is known as fan-fold sheet. The fan-fold sheet is a foldable continuous sheet having feed holes at both side ends, and perforated tear lines along which the recording sheet FP is easily cut off. Projections are provided on the endless belt 21 which are to be fitted to the feed holes of the continuous form recording sheet FP. The continuous form recording sheet FP is fed from a feed port 1 to a discharge port 2. It should be noted that the printer 100 is designed to print pages between perforations in order to prevent printed data from being torn apart when the recording sheet FP is torn off at the perforated tear lines.

In case of a printer using a cut-sheet, the distance between transferring position and fixing position is not so important because printing data for one page is printed onto one sheet of recording paper. On the other hand, in a printer using a continuous sheet, if the portion of the sheet carrying unfixed toner image is caused to pass through the fixing position and fixed, the paper may be wasted to the extent of the distance between transfer and fixing positions. Consequently, it is necessary to determine the portion of the sheet carrying a toner image to be fixed. In other words, it is necessary to determine the portion carrying an unfixed toner image to be remained in the printer between the transfer and fixing positions.

When the printing quality is taken into consideration, the interruption and resumption of transfer and fixing should preferably be made at the perforations, where data is not printed. For this reason, the distance between the transfer position and fixing position is preferably arranged equal to the length of one page, so that the perforations are located at the transfer and fixing positions when printing is stopped.

As arranged above, the portion carrying an unfixed toner image for one page remains between the transferring and fixing positions, in a standby state, when the printing is terminated. When another page is printed, the unfixed toner image is fixed and the remaining page is discharged. In this way, waste of paper due to the fixing of every transferred image becomes avoidable.

The distance between the transferring and fixing positions of this printer 100 is set to eleven inches long for the continuous recording sheet having a page length that is eleven inches long.

The transfer unit 10 comprises a charger 12 for charging a photoreceptor material on the circumferential surface of the photoconductive drum 11 with electricity, the laser scanning unit 13 for exposing the photoconductive drum 11 to light, a developing unit 14 for adhering toner on to the latent image formed on the photoconductive drum 11, a transfer charger 15 for charging the recording sheet FP with electricity to cause to toner image to be transferred to the recording sheet FP, a cleaning unit 16 for removing the residual toner on the drum, and a discharging LED 17 for totally exposing the photoconductive drum 11 to light, so as to removing the charge thereon.

The photoconductive drum 11 should be exchanged after being used for printing a certain number of pages, since its properties will deteriorate and it will fail to provide clear printing. For example, a limit of use is set at approximately 20,000 pages. The number of printed pages are electrically counted and recorded in a counter by a control system which will be described later. This counter is reset when an upper cover UC is shut after a new photoconductive drum 11 is installed.

An outwardly protruting projection (not shown) is provided on a new photoconductive drum 11. As the projection presses down a reset switch, not shown, on the body side, the control system can detect that the new photoconductive drum 11 is placed in position. The projection retracts when the operation is started and an indication of the new drum disappears from the display. The control system resets the counter when the upper cover UC is shut after the reset switch is turned on.

The laser scanning unit 13, which is secured to the upper cover UC, continuously deflects ON/OFF-modulated beams from a semiconductor laser (not shown) by means of a polygon mirror 13a. The laser beams are converged by means of a $f\theta$ lens (not shown), reflected by a beam bender 13b so that scanning lines are formed on the photoconductive drum 11, then an electrostatic latent image is formed on a dot basis, as the drum rotates.

The developing unit 14 comprises a toner case 14a in which toner is accumulated, a developing roller 14b for adhereing the toner onto the circumferential surface of the photoconductive drum 11, provided at the lower end of the case 14a, and a piezoelectric sensor acting as a low toner sensor 14c for detecting the presence or absence of the toner in the case 14a.

In normal text printing, the printing of letters are started from the left-hand side of paper so that the frequency of use of toner normally tends to become high in portion corresponding to the left-hand side of the paper. For this reason, the toner low sensor 14c is provided in the portion corresponding to the left-hand side of the paper where the toner consumption is large.

Conventionally, two dry development methods are generally known. One of them is a so-called monocomponent development method, and the other is a two-component development method.

In the two-component development method, carrier is mixed with the toner, and stirred at a relatively high speed by a scraper or the like, in order to charge the toner.

On the other hand, in the monocomponent development method, toner is fed to a developing roller or the like, without using carrier for charging the toner. This monocomponent development method is disclosed in the U.S. Pat. No. 3,909,258. However, there is a problem in this monocomponent development method. That is, the toner tends to form the block in a toner box. In order to overcome the above problem, an improved monocomponent development method, in which a relatively small amount of carrier is mixed with the toner, is disclosed in the U.S. Pat. No. 4,640,880. With the mixture of a small amount of carrier with the toner, lubrication between the toner grains is improved, which prevents the toner from forming blocks. It should be noted that the mixture of the carrier with the toner does not affect the chargeability of the toner. In this improved monocomponent development method, the main function of the scaper is to feed the toner to the developing roller or the like. Accordingly, the scraper rotates relatively slowly in the toner box.

Figure 3:
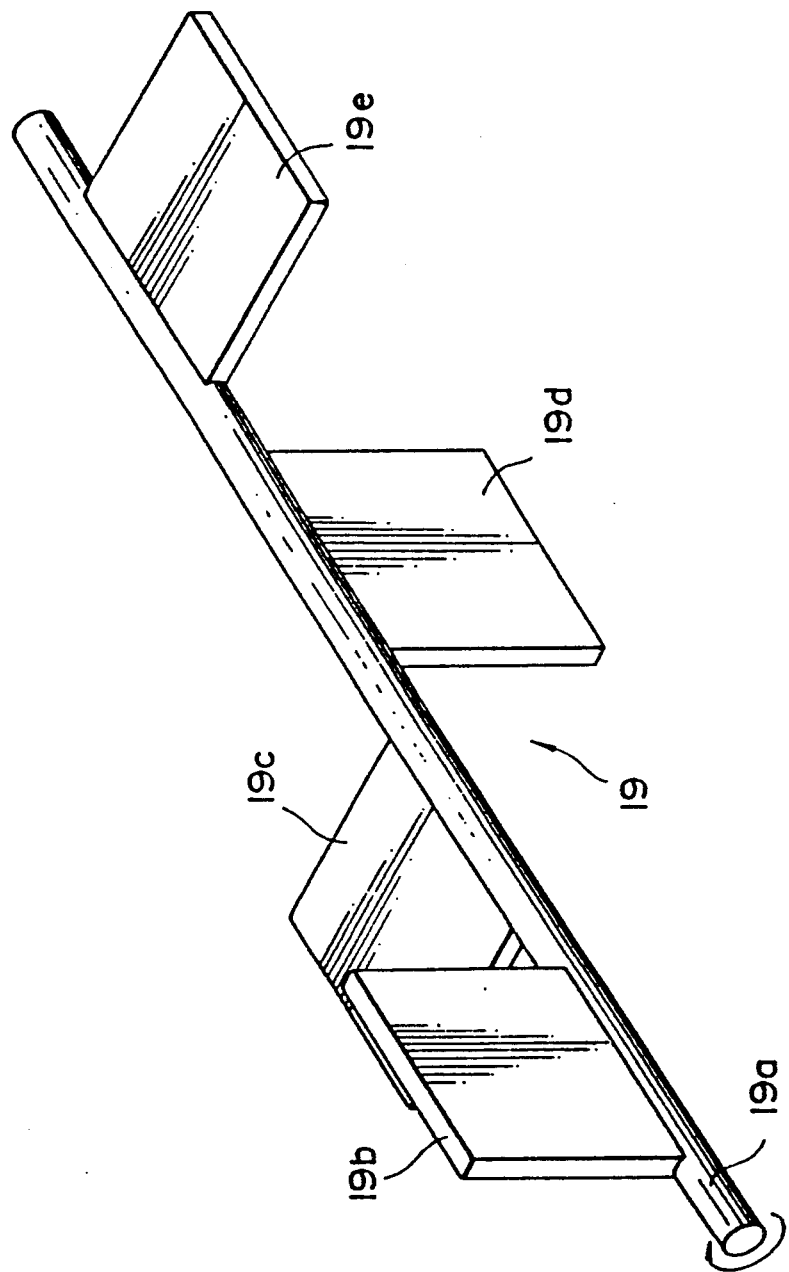
FIG. 3 is a perspective view of a scraper.

A scraper 19 is provided in the toner case 14a. The scraper 19 slowly rotates to supply the toner therein to the developing roller 14b. The scraper 19 is, as shown in FIG. 3, composed of a rotary shaft 19a to be driven by a main motor, and four pieces of blades 19b, 19c, 19d, 19e fitted such that the angle between the surfaces of the blades 19b and 19c is 90 degrees, that of the blades 19b and 19d is 180 degrees, and that of the blades 19 and 19 is 270 degrees. In this specification, this angle will be called a mounting angle, i.e., the mounting angles, with respect to the blade 19b, of the blades 19c, 19d, and 19e are 90 degrees, 180 degrees, and 270 degrees, respectively. The blades 19b through 19e are driven to rotate in the direction of an arrow shown in FIG. 3.

Since the four blades are arranged to have different mounting angles, it becomes possible that the load applied when the toner is forced out is one-quarter of the conventional scraper having all the blades set to have the same mounting angles. Consequently, the load applied to the motor decreases and fluctuates less with the scraper of this embodiment, thus suppressing noise generation.

By sequentially making the mounting angles of the blades of the scraper 19 different, as stated above, a certain amount of toner can be gradually moved to a portion corresponding to the right-hand side of the paper as the scraper 19 slowly rotates.

When toner consumption in the portion corresponding to the right-hand side of the paper increases as it is used for an graphic output, for instance, a low toner condition is left undetected by the low toner sensor 14c. In such a case, as the conventional scrapers do not function to move the toner in the manner stated above, carrier may be transferred onto the circumferential surface of the photoconductive drum 11.

According to the scraper in this printer 100, the occurrence of the carrier being transferred on the photoconductive drum 11 is avoided even when the toner consumption is large on the side where the toner low sensor 14c is not provided.

The transfer charger 15 is secured to an arm 15a which can be rotated by a cam mechanism around a pivot shaft L1. Moreover, a pair of guide rollers 18a, 18b are integrally secured to the arm 15a, the guide rollers 18a*m*18b being laterally positioned so that the continuous form recording sheet FP is nipped therebetween.

When printing is started, it is necessary to idly rotate the photoconductive drum 11 without feeding the recording sheet until the exposed portion of the photoconductive drum 11 is located at the transfer position. In this case, the arm 15a is moved down to lower the guide rollers 18a, 18b, and accordingly, the recording sheet FP is retracted from the circumferential surface of the photoconductive drum 11. The life of the photoreceptor material is thus prevented from being shortened because of wear. In addition, the paper is also prevented from being soiled by residual toner on the photoconductive drum 11.

An opening is formed in the transfer charger 15. The opening of the transfer charger 15 is arranged so that its rearward half, in the feeding direction of the recording sheet FP, is covered with a Mylar film 15b. The discharging area, which is uncovered, of the transfer charger 15 is arranged at the upstream side in the rotational direction of the photoconductive drum 11 with respect to the contact portion between the photoconductive drum 11 and the recording sheet FP.

Conventionally, the whole opening of a transfer charger has been left opened for charging. With such a setting, however, transfer efficiency tends to vary considerably as ambient humidity changes.

By narrowing the discharge area, corona discharge efficiency can be increased to prevent toner from being reversely charged under the influence of the corona discharge. Moreover, the period of time in which the recording sheet FP contacts the photoconductive drum 11 under pressure, after the toner image is transferred thereto, can be set to be longer than that of conventional printers. As a result, transfer efficiency in the whole humidity range can be vastly improved. Experiments show that the transfer efficiency is improved to a great extent, especially when humidity is low. It is also possible to arrange the transfer charger 15 itself in towards the upstream side in the sheet feed direction, in order to prolong the period of time for applying pressure after transfer.

Figure 2:
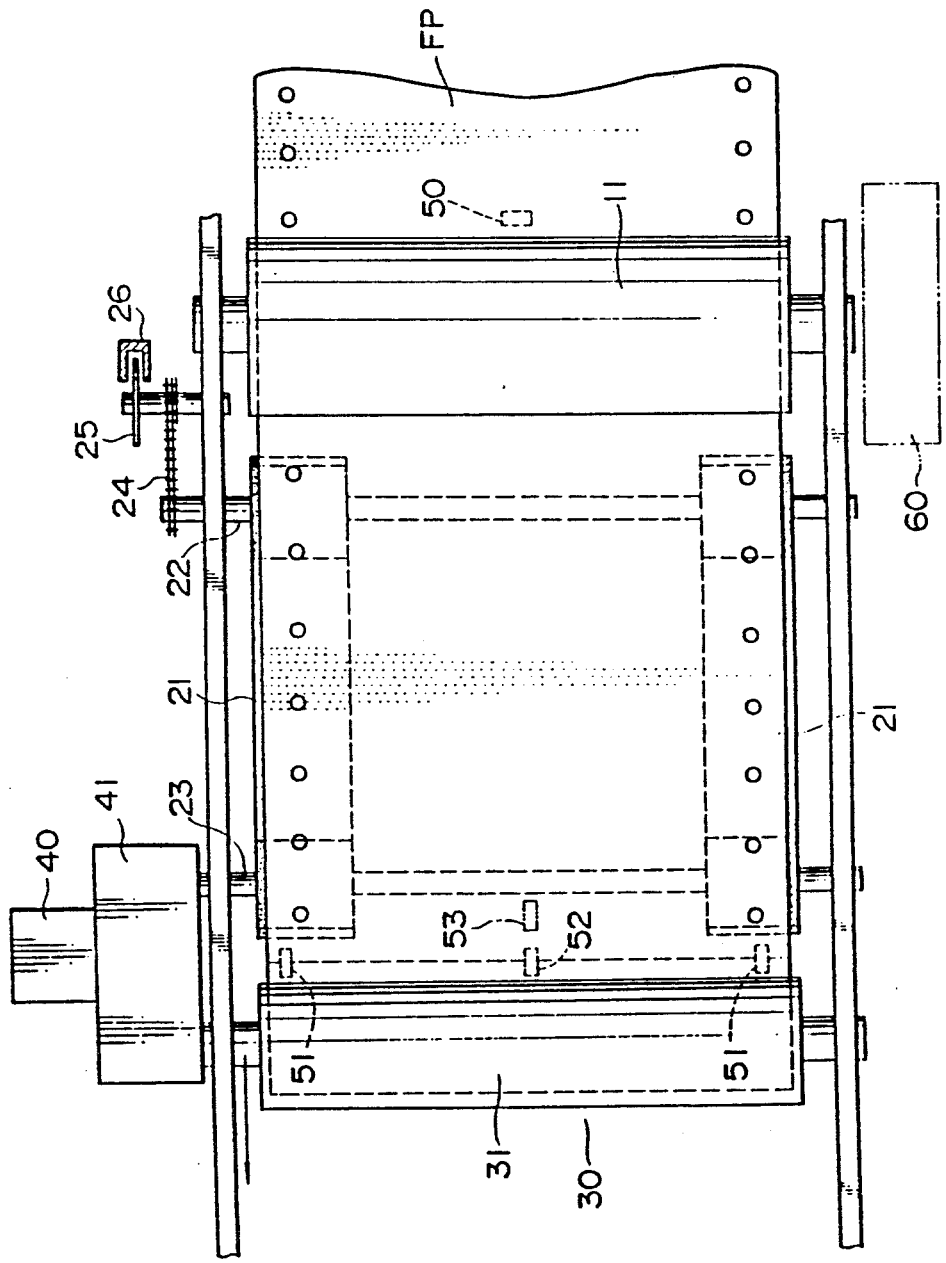
FIG. 2 is a top view of the paper conveying portion of a printer of FIG. 1.

The toner adhering the photoconductive drum 11 is not totally removed therefrom after the termination of the transferring process. As the residual toner is unnecessary for next printing, it is removed by a cleaning unit 16. The waste toner thus removed is stored in a waste toner box 60, detachably fitted to the side of the photoconductive drum 11, as shown in FIG. 2.

When a certain amount of waste toner is accumulated in the waste toner box 60, it overflows into the printer, unless it is discarded. The waste toner may soil the inside of the printer if printing is started without the waste toner box 60.

In conventional printers, sensors have been used to respectively detect the presence or absence of such a waster toner box 60 and the full condition of the waster toner box 60. The problem is that the plurality of sensors thus required tends to render the control system complicated.

In the printer according to the present embodiment, only one sensor is used to detect both conditions.

Figure 4:
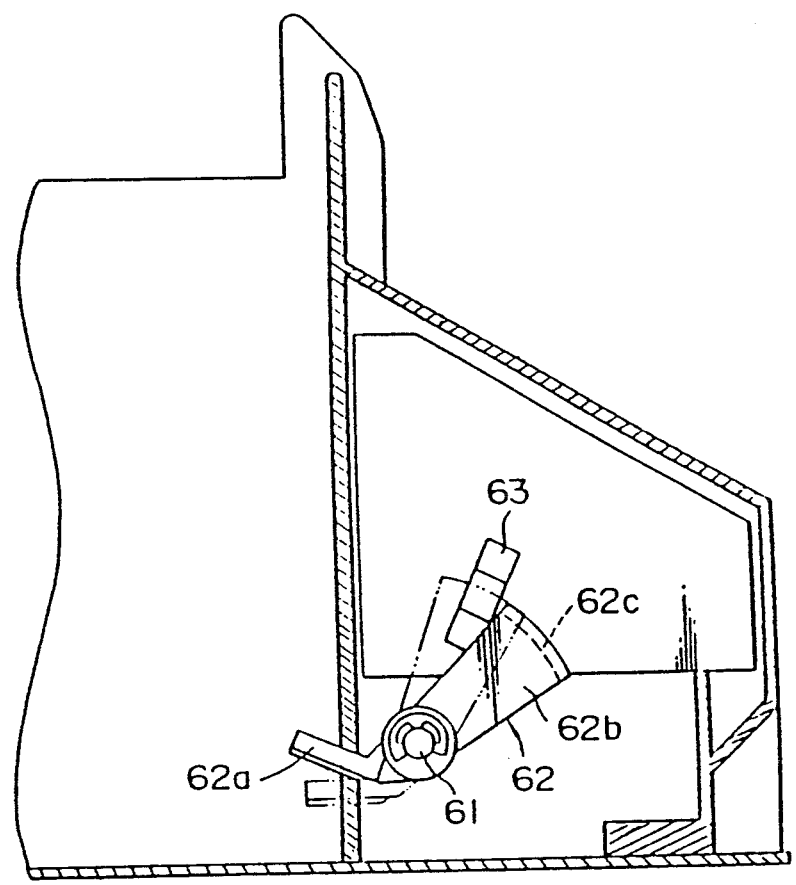
FIGS. 4 and 5 are side views of a waste toner sensor.

FIG. 4 illustrates the detecting mechanism. The waste toner box 60 is movably inserted while being guided by the body. The waste toner box 60 being is vertically movable. An actuator 62 is rotatably pivoted via a fulcrum 61 on the body such that a contact portion 62a is located at a position where the bottom side of the waste toner box 60 is located. A fan-shaped portion 62b is provided at the other end of the rod 62, and a light-shading (or blocking) wall 62c is formed on the arcuate peripheral edge of the fan-shaped portion. The light-shading wall 62c is capable of crossing the space between a light receiving element and a light emitting element of a photo-interrupter 63.

If the waste toner box is not attached, the rod 62 revolves clockwise due to its own weight as shown by a continuous line of FIG. 4, so that its contact portion 62a ascends and the light-shading wall 62c is located under the photo-interrupter 63. In this state, the photo-interrupter 63 produces a signal indicating that no rays of light are shaded (or blocked) and the control system determines that an error relating to the waste toner box 60 has occurred.

When the waste toner box 60 is attached, the contact portion 62a is forced down by the weight of the box and the rod is rotated counter-clockwise up to a substantially horizontal state, as shown by a broken line of FIG. 4. The light-shading wall 62c is thus moved to a position where it screens the photo-interrupter 63. In this state, the photo-interrupter produces a signal indicating that the rays of light are shaded or blocked and the control system determines that no error relating to the waste toner box 60 has occurred.

Figure 5:
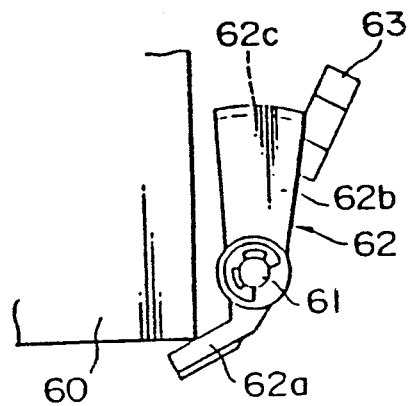

When waste toner box 60 is filled with waste toner, the contact portion of the rod descends due to the weight of accumulated toner, as shown in FIG. 5, and the light-shading wall 62c moves up to the left-hand side of the photo-interrupter 63. In this state, the control system again determines that an error relating to the waste toner box 60 has occurred.

In this way, one sensor can be used to detect both that the waste toner box 60 is not installed, and that the waste toner box 60 is filled with waste toner. Although this sensor is arranged so as to monitor the presence or absence of the waster toner box and the amount of waste toner from the balance in weight between the rod 62 and the waste toner box 60, it is possible to employ a spring or the like to hold the balance as well as the dead weight of the rod 62.

The tractor unit 20 is arranged so that, as shown in FIG. 2, the two endless belts 21, 21, stretched between a driving shaft 23 22 and a driven shaft 23 are driven by the main motor 40 via a field clutch (not shown), hereinafter called the F clutch) and a gear train (not shown) provided in a gear box 41.

The gear train extending from the main motor 40 up to the drive shaft 23 in the tractor unit 20 is arranged so that the continuous recording sheet FP is fed at the velocity of 50 mm/sec. if the tractor unit 20 is independently feed the recording sheet FP. Moreover, the gear train contains a unidirectional clutch which races with a predetermined resistance in compliance with a tension when the paper is drawn at a rate higher than 50 mm/sec. to prevent the papaer from overdriving the motor 40.

Figure 6:
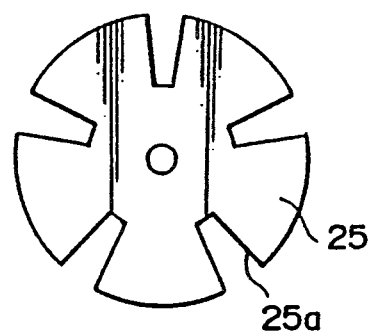
FIG. 6 shows a disc for use in generating PFS pulses.

The driven shaft 22 is connected with a disc 25 via a chain 24. The disc 25 is rotatable in response to the rotation of the driven shaft 22. As shown in FIG. 6, the disc 25 is provided with slits 25a which are spaced from each other by predetermined distance. The disc 25 is positioned (i.e., received) between the light emitting member and the light receiving member of the photo-interrupter 26, and a pulse corresponding to the amount of movement of the recording sheet FP is obtainable. The photo-interrupter 26 is hereinafter called the PFS (Paper Feed Sensor,) with its output constituting the PFS pulse.

The PFS pulse is outputted such that when the recording sheet is fed by ¼ inch, one pulse is outputted. Further, the signal corresponding to the slit portion 25a and the signal corresponding to the portion other than the slit 25a correspond to the perforated lines of the continuous recording sheet FP and the non-perforated portion, respectively.

However, the positional relation between the disc 25, used for generating the PFS pulse, and a base plate on which the photo-interrupter 26 is mounted, may not be the same in individual printers because of assembly errors. If the slits 25a formed in the disk 25 are rectangular in the radial direction, the pulse width thus outputted may vary, depending on where the photo-interrupter 26 has detected the slits 26a, in the radial direction of the disc 26, and depending on shift in the relative radial position between the disc 25 and the photo-interrupter 26.

As this printer is arranged so that the paper feed error is judged from the detection of the PFS pulse, the variation of the pulse width may result in misjudgement on the error.

For this reason, the slit 25a formed in the disc 25 is fan-shaped so that its width gradually increases toward the circumference of the disc. In other words, the slit 25a is defined by a pair of radii of the disc 25. With this fan shape, the width of the pulse thus outputted can be unified (i.e., the ratio between slit 25a and the non-slit portion remains constant) irrespective of the position where the photo-interrupter has detected the slit in the radial direction of the disc 25, thus preventing misjudgement of an error. In addition, the assembly precision required is eased and hence assembly workability is improved.

Sensors for detecting paper errors will be subsequently described.

In a conventional laser printer using cut sheets, two sensors are provided along a sheet feed path to detect the jamming of recording sheet. Paper errors are detected when the sheet does not pass the down-stream side sensor a predetermined time after it passed the up-stream side sensor. Since there are no breaks in the continuous recording sheet, the aforementioned method of detection cannot be utilized in a printer using a continuous recording sheet.

In this printer 100, there are provided four kinds of sensors for detecting the presence or absence of the paper along the sheet feed path. The sheet empty and paper jamming conditions are detected by detecting the changing of a sheet feed speed and the lifting up of the sheet.

The first sensor is an empty sensor 50 provided between the feed port 1 and the transfer unit 10. This printer 100 does not print on the portion adjacent to the perforated lines, which is used as a break between pages. The perforated lines are located right under the photoconductive drum 11 of the transfer unit 10 and at the position of the fixing rollers 31, 32 when printing is stopped in this printer 100. The sheet empty condition can be detected from the output of the empty sensor 50 when the last page of the recording sheet FP is located in the printer. Moreover, it is detectable, by counting the PFS pulses, what portions of the recording sheet are positioned at the transfer unit 10, at the fixing unit 30, and further at the empty sensor. Consequently, counting of the PFS pulse and the output of the empty sensor 50 can be used to detect the recording sheet FP being torn off at a non-perforated portions.

The second sensor comprises skew sensors 51, 51 provided between the fixing unit 30 and the tractor unit 20. The skew sensors 51, 51 are used for detecting the skew and cutting-off of the continuous recording sheet FP. The sensors 51, 51 are capable of detecting the sheet when at least one side thereof lifts up.

The third sensor is a top sensor 52 provided in the central part of the sheet between the skew sensors 51, 51. The top sensor 52 is used for detecting the leading end of the paper when printing is started. After the predetermined number of pulses have been counted, after the leading end of the recording sheet FP passes the top sensor 52, the leading end thereof reaches the fixing unit 30, whereas the following perforations are positioned at the transfer unit 10.

The fourth sensor is a jam sensor 53 provided in the upper cover UC, substantially opposite to the top sensor 52 with the sheet feed path therebetween. The jam sensor 53 is used for detecting the sheet, when the sheet is jammed in the fixing unit 30, and the central part of the recording sheet swells out to contact the jam sensor 53.

The fixing unit 30 comprises a heat roller 31 provided in the upper portion of FIG. 1, and a press roller 32. The continuous recording sheet FP is nipped between the rollers 31, 32, and is pressed against the heat roller 31 by the press roller 32 with a predetermined pressure. In the heat roller 31, a heating halogen lamp, and a thermistor for temperature detection are provided.

The heat roller 31 is driven by the main motor 40 to rotate via the F clutch and the gear train and is arranged so that, when the continuous recording sheet FP is held between the rollers 31, 32, it is fed at the speed of 75 mm/sec.. As a result, the continuous recording sheet FP is actually driven by the fixing unit 30, whereas the tractor unit 20 mainly functions to prevent skewing of the continuous recording sheet FP.

If the continuous recording sheet FP is kept pressed against the heat roller 31 while printing is in the standby state, the paper may be scorched by the heat of the heat roller 31. In order to avoid scorching of the sheet, in this printer 100, the press roller 32, facing the heat roller 31, is made vertically movable so that the continuous sheet is retracted from the heat roller 31 when printing is in standby state.

In the meantime, the rocking of the press roller 32 and that of the transfer charger 15 are implemented by the same drive means.

Figure 7:
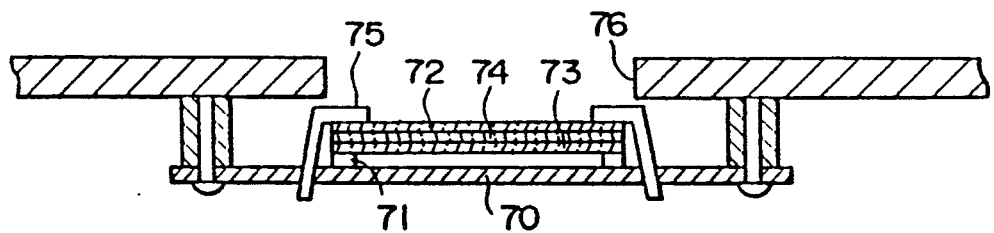
FIG. 7 illustrates a construction of a conventional liquid crystal display panel.

A general liquid crystal display panel heretofore in use is, as shown in FIG. 7, built by mounting two glass plates 72, 73 on a substrate 70 via conductive rubber member 71 and nipping a layer of liquid crystal 74 between the glass plates 72, 73. Moreover, the edges of the glass plates are enclosed with a frame 75, which is secured to the substrate 70. The substrate 70 is secured with screws onto the body so that the display panel can be viewed through an opening 76.

The arrangement stated above, however, has posed a problem in that the large number of parts makes it troublesome to assemble the display unit.

Figure 8:
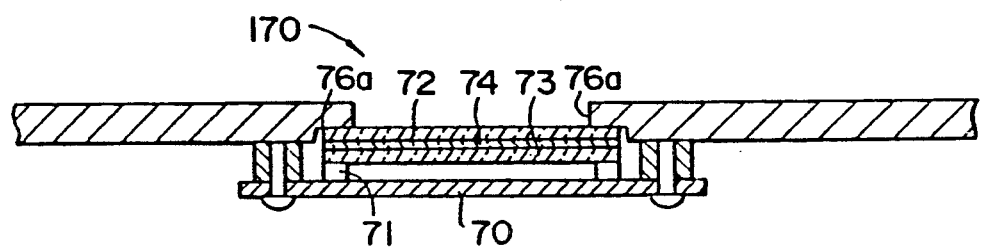
FIG. 8 shows a construction of a liquid crystal display panel of the printer of FIG. 1.

In liquid crystal display unit 170 of this embodiment, there is provided a stepped portion at the peripheral edge of the opening 76 of the body as shown in FIG. 8. While the glass plates 72, 73, between which the liquid crystal layer 74 is inserted, are directly mated with the stepped portion 76a, the combination is secured with screws onto the body. With this arrangement, the frame can be omitted, so that the number of parts becomes reducible.

Figure 9:
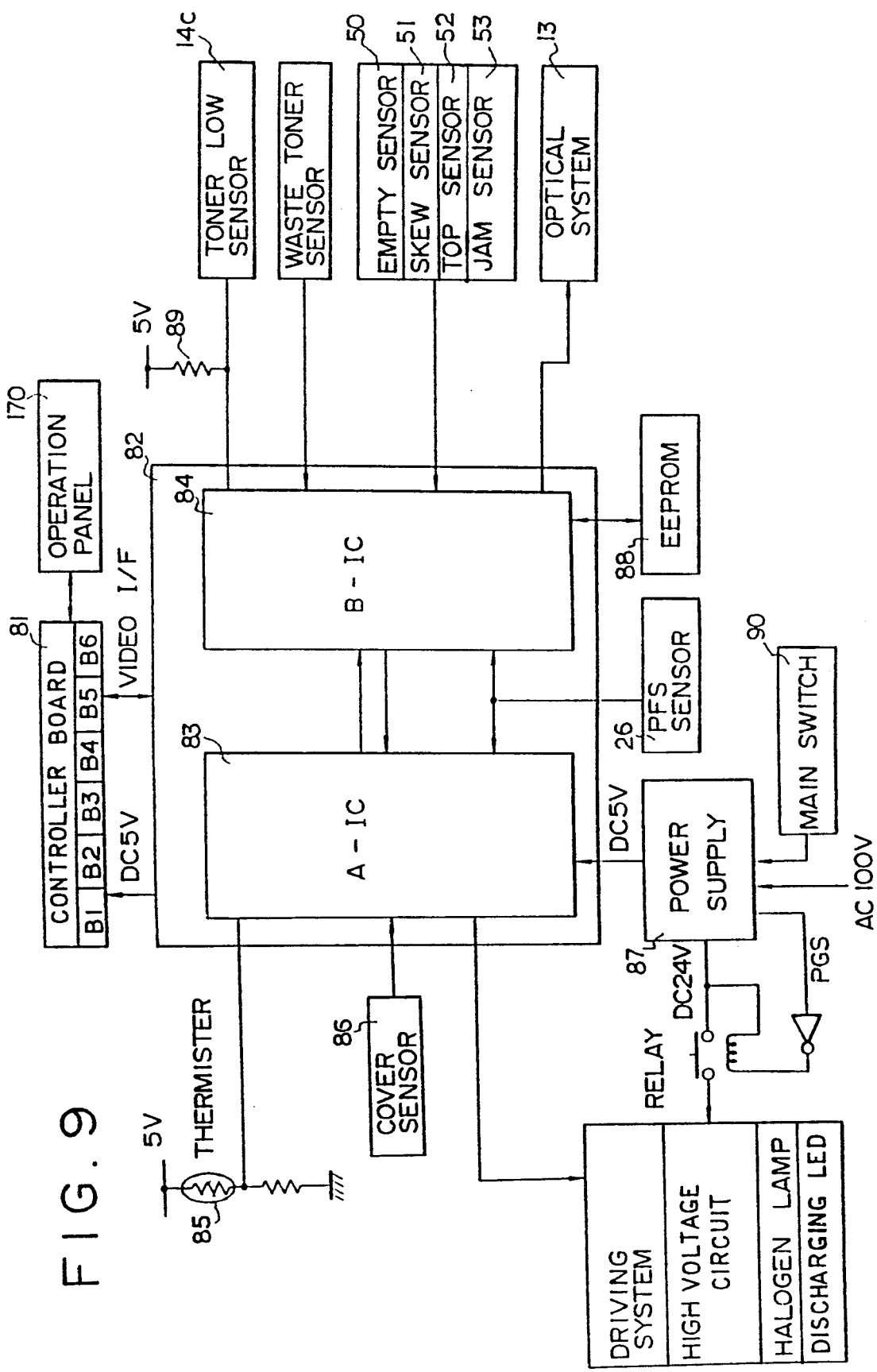
FIG. 9 is a block diagram illustrating a control system in the printer of FIG. 1.

FIG. 9 shows a control circuit of the printer.

This circuit comprises a controller 81 for developing the printing data received from a host computer into a map on a dot basis and outputting the map, and a driver 82 comprising two CPU's: one of which, A-IC 83, is mainly for controlling printing; and the other, B-IC 84, is mainly for performing error detection.

The controller board 81 is equipped with buffers B1 through B6 whose capacity is large enough to develop printing data equivalent in volume to six pages. Data are successively written to these buffers B1, B2, B3 . . . B6, B1 . . . in this order, when printing is started, and are transmitted to the driver board in the same order. The controller 81 and the driver board 82 are connected via a video interface (VIDEO I/F) for transmitting various data as well as printing data. The controller 81 requests the driver to carry out the printing operation when at least data equivalent to one page is stored in the buffer.

When continuous printing is desired, data equivalent to two preceding pages which had been printed, is held in the buffers for reprinting purposes. When data storage is started from the buffer B1, for instance, the data stored in the buffers B1, B2 are hold therein until the buffer B3 completely outputs its data. New data is written to the buffer B1 at the time the outputting of the data stored in B4 is started.

The data recovery function will subsequently be described.

The printer 100 in this embodiment is designed to transfer from the buffer the data for the pages which incompletely printed in the normal way when a jam occurs during printing, when paper empty is detected at portions other than a perforation line, or when the upper cover UC is released during printing.

FIG. 13 illustrates the relation of the transfer portion, the fixing portion and the discharge portion in the printer 100 to continuous form recording sheet being fed therein.

When printing performance is taken into consideration, it is preferred that the interruption and restarting of transfer and fixing is implemented at the perforation line where printing is not to be made. For this reason, the perforation line is located at a page break between the transferring and the fixing portions, when the printing operation is stopped, as the interval between the transferring and the fixing portions is set equivalent to one page. Consequently, the paper equivalent in space to one page remains between the transfer portion and the fixing portion when the standby condition is maintained after the normal printing operation is terminated. When data equivalent to the following one page is transferred or when FF (Form Feed: turning pages) is requested, the preceding page is fixed and discharged.

Since the printer 100 in this embodiment is to be operated on the assumption that the page length (a length between two perforation lines) of the continuous recording sheet preimarily used is 11-inch long, the interval between the transfer and the fixing portions is set at 11 inches. In addition, the interval between the fixing portion and the discharge portion is L.

When a jam occurs during printing in the printer, at least the page positioned between the transfer and the fixing portions needs recovering. However, it is highly probable that the paper might be damaged because of a jam as it passes through the discharge port after passing the fixing unit. In this example, it has therefore been arranged that all the pages positioned between the transfer unit and the discharge port are to be recovered.

As the number of pages so positioned varies with the operation in progress, the number of pages to be reprinting is determined on the driver 82 side in accordance with the state in which the recording sheet is being fed. The decision made on which one of the pages is being printed is based on the PFS pulse on the driver side.

There are four kinds of page count to be transferred from the driver to the controller: page count '0' denotes no recovery; '1' the reprinting of a page being transferred; '2' the reprinting of the page being transferred and the preceding one; and '3' the reprinting of the page being transferred and the preceding two pages.

When new continuous paper is set in the printer, the upper cover UC is closed with the leading end of the recording sheet mated with the tractor unit 20 and the paper is fed until it is inserted into the fixing unit 30. When the PFS pulse is counted for a predetermined number of unless after the leading end of the recording sheet has passed the top sensor, the leading end thereof reaches the fixing unit 30 and the following perforation line is located at the transfer portion. However, the recording sheet may not be held when the press roller ascends even though the leading end of the recording sheet has reached the fixing unit.

When the recording sheet is set, an additional page of the paper is loosely fed so as to locate the border between the first and the second pages at the fixing portion as shown in FIG. 13(a). As a result, the preceding two blank pages are discharged and the third page is intended for printing.

When printing is started, fixing of the third page is started. When the fixing of the third page is terminated as shown in FIG. 13(b), image transferring to the fourth page and discharging of the third page are executed. If the recording sheet is located between the positions shown in FIG. 13(a) and FIG. 13(b), only the third page is positioned between the transfer unit and the discharge port and intended for printing. Therefore, '1' is the page count needed for recovery when a jam occurs in this case.

The third and the fourth pages are positioned between the transfer unit and the discharge port, and intended for printing until fixing on the third page end, as and the transferring to the fourth page shown in FIG. 13(c) after the state of FIG. 13(b). Therefore, '2' is the page count needed for recovery when a jam occurs in this case.

When fixing of the fourth page and the transferring of the fifth page are completed halfway, the third page is discharged from the discharge port as shown in FIG. 13(d). As shown in FIG. 13(e), fixing on the fourth page and the transfer of the fifth page are terminated as the printing operation progresses further.

The third, the fourth and the fifth page are positioned between the transfer unit and the discharge port, and intended for printing when the recording sheet is located between the positions shown in FIGS. 13(c) and (d). Therefore, '3' is the page count needed for recovery when a jam occurs in this case. Similarly, the fourth and the fifth page are those positioned between the transfer unit and the discharge port and indented for printing when the sheet is located between the positions shown in FIGS. 13(d) and (e). Therefore, '2' is the page count needed for recovery when a jam occurs in this case.

When printing is continuously carried out further, the positional condition of the recording sheet shown in FIGS. 13(c)–(e) are repeated and the page count is switched between '2' and '3'.

FIG. 14 is a flowchart for use in determining the page counts described above. The process shown therein is carried out every time interval which is set as a timer interruption process with respect to the main sequence of the printer, for instance. In this case, the page count PAGE is reset to 0 when power is supplied or when the upper cover UC is opened.

The driver 82 decides whether or not the perforation lines as the border lines between pages passes the transfer unit in Step S.1 and increments the page count in S.2 when it passes there. In S.3, the driver 82 decides whether or not FF (Form Feed or sheet feed) is executed and increments the page count PAGE in S.4 when it is executed. The FF is a process which forces the unfixed portion to be fixed before being discharged while printing is paused. This process can be requested by the host computer or with the operation panel, and further, is automatically performed when the sheet empty is detected as the empty sensor is turned on.

In steps S.5 through S.7, the page count PAGE '2' is restored at a point of time the page that has passed the fixing unit is discharged from the discharge port after the page count PAGE reaches '3' because of the increment in step S.2.

The setting of the page count can be effected in accordance with the state in which the paper proceeds as shown in FIG. 13 through the process shown in the flowchart FIG. 14.

The A-IC 83 is connected with a high voltage circuit to which provides biases to which the charger 12 and the like in the transfer unit 10 are connected, and further, a drive system, including the main motor 40, the F clutch 41, the halogen lamp in the heat roller 31 are connected to the A-IC to be controlled thereby.

A thermistor 85 for detecting the temperature of the heat roller 31, a cover sensor 86 for detecting the opening and closing of the upper cover UC, and the PFS sensor (or photo-interrupter) 26 are connected to the A-IC as the sensors for supplying data to the A-IC.

The heat roller 31 is controlled so as to have a high temperature as the fixing temperature only during printing, and a low temperature as the standby temperature when the printer is in a standby state to save power and to prevent the printer temperature from rising.

Power is supplied to the halogen lamp provided in the heat roller 31, and acting as a heat source, from the power supply 87 for supplying 100 volts a.c. The power supply is turned ON and OFF by a signal from A-IC 83. A-IC 83 receives an analog output from the thermistor provided adjacent to the heat roller 31 and executes A/D conversion so as to execute temperature control.

Figure 10:
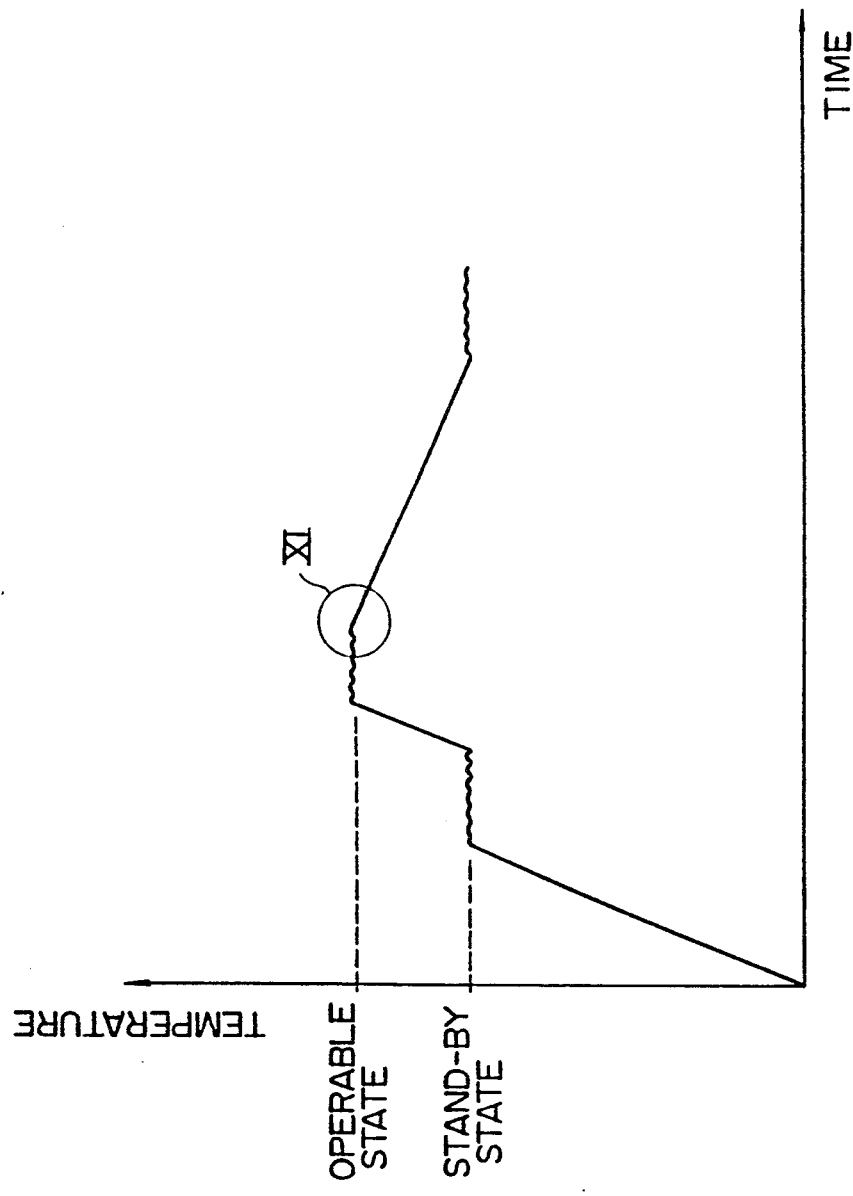
FIGS. 10 and 11 are graphs illustrating temperature control of the heat roller for the printer of FIG. 1.

The temperature control is effected with an allowance (i.e. range) of approximately ±5 degrees. As a result, the actual temperature of the heat roller 31 fluctuates within upper and lower limits as shown in FIG. 10. Accordingly, there is a difference in the time required to lower the temperature to a certain value depending upon the actual temperature of the heat roller 31. If the actual temperature of the heat roller 31 is at the upper limit of the fixing temperature range, the time required to lower the temperature to the certain temperature is relatively long, while, if the actual temperature is at the lower limit of the fixing temperature range, the time is relatively short. In other aspect words, the temperature of the heat roller 31, after a predetermined time has past, differs, depending upon the temperature of the heat roller 31 when the temperature began to be lowered. It is obvious that more warm-up time will be required to raise the temperature of the heat roller 31 to the operable (fixing) temperature from the lower temperature than from the higher temperature.

Figure 11:
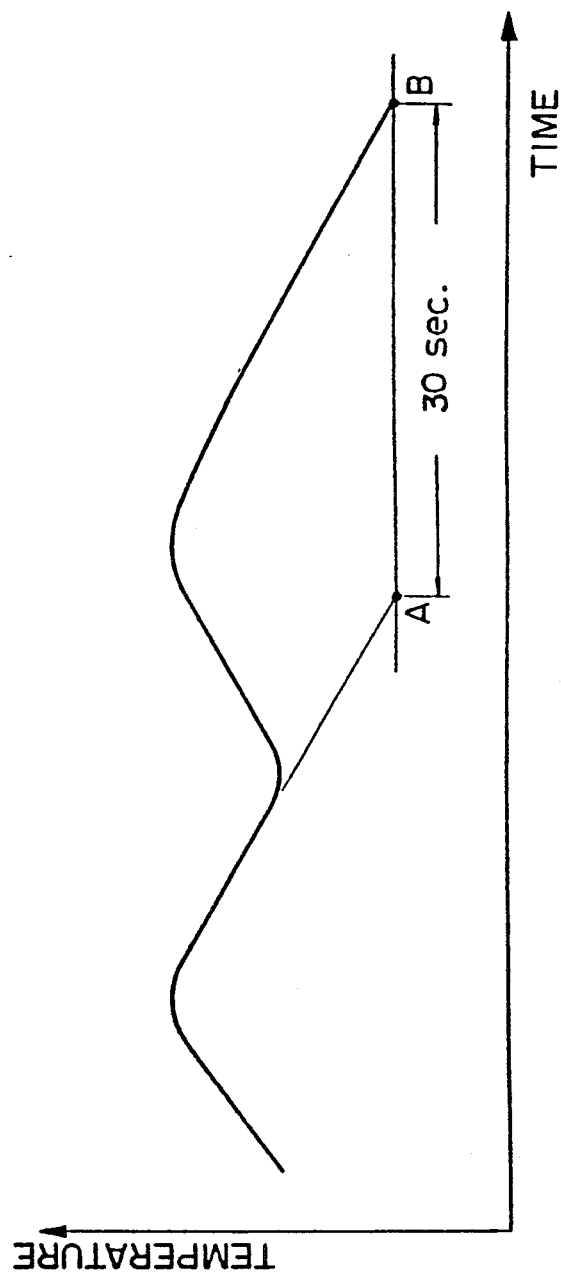

FIG. 11 shows the difference between two cases when the temperature of the heat roller 31 is lowered to a predetermined temperature set between the fixing and the standby temperatures. Point A shows a point where the temperature falls to a predetermined temperature, by being lowered from the lower limit of the fixing temperature, and point B shows a point where the temperature falls to a predetermined temperature after being raised to the upper limit, then lowered from the upper limit. In this example, there are approximately 30 seconds between point A and B.

In the printer of this embodiment, when the temperature is lowered from the fixing temperature to the standby temperature, the temperature is first raised to the upper limit of the fixing temperature before being lowered. In this way, the temperature is prevented from being lowered from a relatively low temperature within the fixing temperature range so that the warm time required to raise the temperature up to the fixing temperature again, can be shortened.

The B-IC 84 is connected with the semiconductor laser of the laser scanning unit 13 and an EEPROM 88 for storing printer life data.

As to means for inputting data to the B-IC 84, the empty sensor 50, the skew sensor 51, the top sensor 52 and the jam sensor 53 and are primarily connected to the B-IC 84 which are concerned with the paper feeding. In addition, the B-IC 84 is connected with the waste toner sensor for warning of the presence or absence of the waste toner box 60 and the amount of accumulated waste toner, and the toner low sensor 14C for warning the shortage of toner, which are provided in the transfer unit 10 and constitute the sensors concerned with toner.

As to the toner low sensor, in a conventional laser printer, it is common practice to set the sensor to output a low level signal when no toner is detected. With this arrangement, however, the problem is that when the sensor is disconnected, the low level signal indicating the low toner condition cannot be detected. In other word, the disconnection of the sensor and the toner-sufficient condition cannot be distinguished in the conventional printer.

In this embodiment, the toner low sensor 14c outputs a high level signal when toner low is detected, while the B-IC 84 receives the signal in a pull-up state by use of a pull-up resistance 89 for receiving the signal in the pull-up state.

HIGH is thereby inputted to the B-IC 84 when toner low is detected by the sensor 14c, when disconnection occurs in the sensor system and when the developing unit 14 installed with the toner low sensor 14c is not attached to the printer 100. In other words, a number of symptoms can simultaneously be detected with one sensor 14c.

The toner low sensor 14c comprises the piezoelectric element incorporated in the bottom surface of the toner case 14a and it outputs a LOW level signal on sensing the pressure applied by the toner accommodated in the toner case 14a; and a HIGH level signal without such pressure.

When sufficient toner is stored in the toner case 14a, the toner is always placed on the piezoelectric element serving as the toner low sensor 14c, despite the operation of the scraper 19, and the LOW level signal is always outputted. On the other hand, when the amount of toner is low, the HIGH level signal is outputted irrespective of the operation of the scraper 19.

If the toner case 14a is substantially half filled with the toner, the toner is alternately placed on and swept off of the toner low sensor 14c as the scraper 19 slowly rotates, thus causing alternative output of the LOW and HIGH signals. Monitoring the duty ratio of the output of the toner low sensor 14c, the B-IC 84 judges the amount of the toner to be low when the HIGH signal exceeds 80 percent.

As the toner is not supplied to the developing roller 14b by the scraper 19 immediately after power is supplied, the output of the toner low sensor during the first three seconds, for two rotations of the scraper, is ignored. After the elapse of the three seconds, the toner low sensor 14c starts monitoring. Misjudgement of a low toner condition can thereby be prevented before the operation of the scraper 19, when power is supplied.

The A-IC 83 and the B-IC 84 controls the printer 100 by exchanging data via a plurality of signal lines. From the B-IC 84 to the A-IC 83, transmitted are signals such as a signal indicating that the B-IC 84 is in a standby state, a STOP signal for immediately stopping the operation of each unit of the printer 100 when an emergency (i.e., urgent) error occurs, even if printing is being executed, and a PAUSE signal for stopping the operation of each unit after the predetermined operations, when a less urgent error occurs.

On the other hand, error signals indicating errors in the drive system are transmitted from the A-IC 83 to the B-IC 84.

The B-IC 84 analyzes the errors detected by itself and the errors transmitted for the A-IC 83 thereto, then determines their degrees of emergency in accordance with predetermined standards. The B-IC 84 selects the STOP or PAUSE signal depending on the degree of emergency, and then transmits the signal to the A-IC 83. The less urgent errors are the errors of a toner overflow, a toner low and a paper empty, while the other errors are treated as emergency errors.

Figure 12:
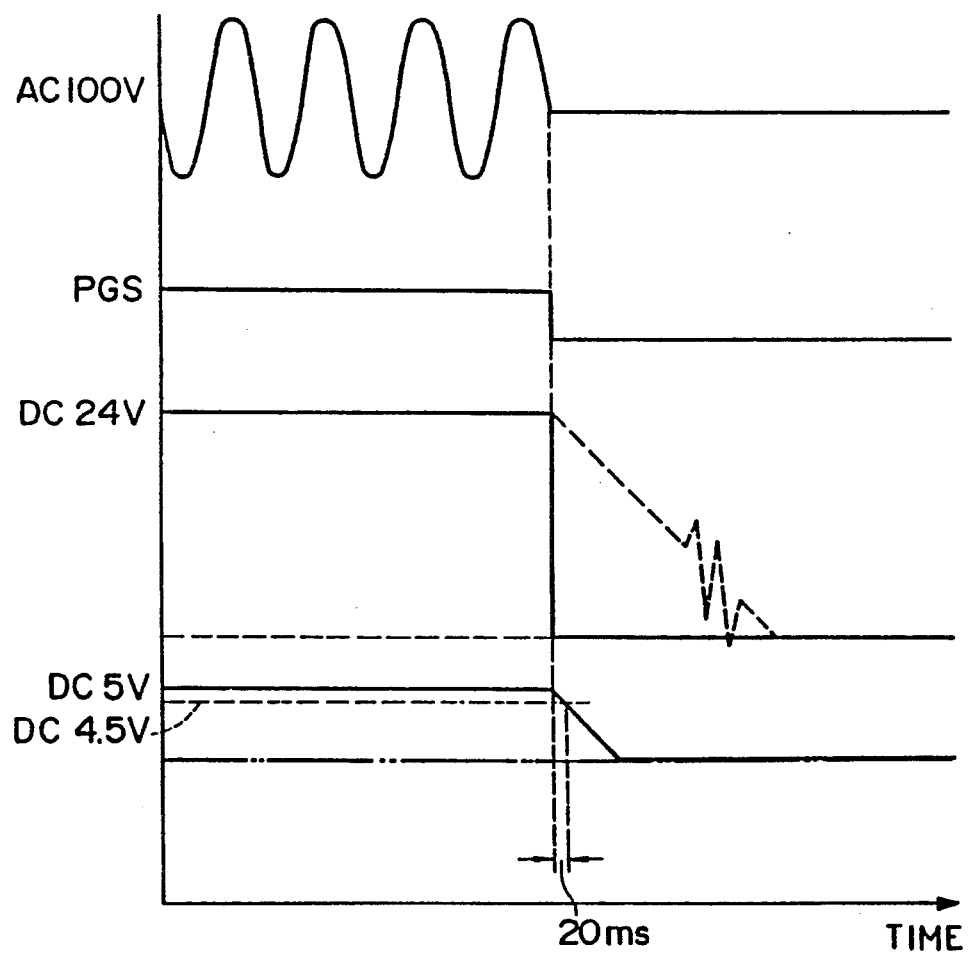
FIG. 12 is a graph illustrating power supply control of the printer of FIG. 1.

One hundred volts a.c. is applied to the printer, the control system being driven at 5 volts d.c., the driving system, such as the motor being driven at 24 volts d.c.. When a main switch 90 of the printer 100 is turned off, the voltage gradually drops from 24 volts d.c. to ultimately 0 volt as shown by a broken line in FIG. 12.

The 5 volts d.c. power supply for the control system is so designed that more than 90 percent of the rated voltage (i.e. 4.5 volts d.c.) is held at least 20 msec. for storing data after the main power supply is turned off. If the voltage becomes less than 90 percent of the rated voltage, the control system may fail to control driving system.

As to 24 volts d.c. power supply for the driving system, the voltage tends to fluctuate while it drops because of the operation of a protection circuit on the power supply side. Further, the control system does not operate as 5 volts d.c. is cut off at that point in time, which may cause vibration of the motor, and hence malfunctions.

In this printer 100, the voltage applied to the driving system is instantaneously dropped from 24 volts d.c. to 0 volt upon turning off the 100 volts a.c. main power supply 87, in order to prevent the aforementioned malfunctions. A relay is provided between the power supply and the driving system as a switch for the function stated above. The relay operates to cut off 24 volts d.c. either when a power good signal (PGS) representing the presence of the main power 87 supply is cut off of when the upper cover is opened.

By instantaneously dropping the voltage from 24 volts d.c. to 0 volt as above, the driving system is stopped while the control system functions with 5 volts d.c. being applied. Moreover, the fluctuation of the voltage is prevented while it is dropping. Consequently, the motor is prevented from vibrating and hence malfunctioning.

Laser printers are generally provided with a data recovery function for reprinting a blank page due to jamming or the like.

Although a reference has been made to the use of continuous sheet whose page length is 11 inches long in the embodiment shown, a continuous sheet whose page length is 12 inches long may also be used by changing a counter for counting PFS pulses therefor.

If 12-inch page length sheet is used in this printer 100, some additional arrangements may also be considered such that the last page carrying an unfixed toner image is discharged when printing is terminated, that the page remaining in the printer 100 is fed when printing is restarted, or that a perforated line is located at the fixing unit with the portion one inch from the next perforation being located at the transfer unit 14.

As set forth above, the optimum number of pages can be retained for data recovery, in accordance with the state in which the paper progresses according to the present invention, whereby the paper is prevented from being wasted, whereas data recovery fit for the use of continuous form recording sheet can be implemented.

The present disclosure relates to subject matters contained in Japanese Patent Application No. HEI 1-293712 (filed on Nov. 10, 1989) and No. HEI 2-98225 (filed on Apr. 11, 1990), which are expressly incorporated herein by reference in their entireties.

What is claimed is:

1. A data recovery device employed in a printer using a continuous form recording medium for reprinting data after printing has been interrupted, said device comprising:

counting means for counting a number of printed pages remaining in a predetermined area of a feed path of said recording medium;

a plurality of data storing means for storing printing data on a page basis, a number of said plurality of data storing means being larger than at least a maximum number of pages that can remain in said printer;

printing means for sequentially reading printing data stored in said data storing means and printing said printing data onto corresponding pages of said recording medium; and control means for restarting sequentially printing data stored in one of said data storing means, said one of said data storing means is identified based on the number of the pages counted by said counting means after printing executed by said printing means has been interrupted.

2. The data recovery device according to claim 1, wherein the length of said predetermined area is longer than a page length of said recording medium and shorter than twice a page length of said recording medium.

3. The data recovery device according to claim 2, wherein, if preceding pages remaining in said printer are non-printed pages and a leading end of a succeeding page, which is printed, is located in said predetermined area, and if a trailing end of said succeeding page is located at an upstream-side of said predetermined area, said count means counts the number of pages as one.

4. The data recovery device according to claim 2, wherein, if a preceeding page is a non-printed page, a leading end of said preceding page has been discharged, and both a leading end and a trailing end of a succeeding page, which is printed, are located in said predetermined area, said count means counts the number of pages as two.

5. The data recovery device according to claiam 2, wherein, if a preceding page is a printed page, a leading end of said preceding page has been discharged, a leading end of a succeeding page, which is printed, is located in said predetermined area, and if a trailing end of said succeeding page is located at an upstream-side of said predetermined area, said count means counts the number of pages as two.

6. The data recovery device according to claim 2, wherein, if a preceding page is a printed page, a leading end of said preceding page has been discharged, both a leading end and a trailing end of a succeeding page, which succeeding page is printed, are located in said predetermined area, said count means counts the number of pages as three.

7. The data recovery device according to claim 2, wherein said predetermined area is an area defined by a printing position and a discharging position of said printer.

8. A printer using a continuous form recording medium comprising a data recovery device for reprinting data after printing has been interrupted, said printer comprising:

counting means for counting a number of printed pages of said recording medium remaining in a predetermined area of a feed path of said recording medium;

a plurality of data storing means for storing printing data on a page basis, a number of said plurality of data storing means being larger than at least a maximum number of pages that can remain in said printer;

printing means for sequentially reading printing data stored in said data storing means and printing said data onto corresponding pages of said recording medium;

detection means for detecting an error condition in a printing operation of said printer; and control means for restarting sequentially printing said data stored in one of said data storing means, said one of said data storing means is identified based on the number of pages counted by said counting means when the error condition is detected by said detection means.

9. The data recovery device according to claim 1, wherein said control means for restarting sequential printing sequentially prints a number of pages of printing data stored in said data storing means in accordance with said counting means counting a number of pages remaining in the predetermined area.

10. The data recovery device according to claim 8, wherein said control means for restarting sequentially printing sequentially prints a number of pages of printing data stored in said data storing means in accordance with said counting means counting a number of pages remaining in the predetermined area.

11. A data recovery device for use in a printer using a continuous form recording medium for reprinting data when printing has been interrupted, said data recovery device comprising:

counting means for counting a number of printed pages that remain in a predetermined area of a record medium feed path;

a plurality of data storing means for storing printing data on a page basis, a number of said data storing means being larger than a maximum number of pages that can remain in said predetermined area;

printing means for sequentially reading printing data stored in said data storing means and printing said data onto corresponding pages of recording medium; and control means for reprinting a number of pages of data stored in said data storing means, the number of pages being reprinted in accordance with counting, by said counting means, of a number of printed pages remaininig in said predetermined area.

* * * * *

UNITED STATES PATENT AND TRADEMARK OFFICE
CERTIFICATE OF CORRECTION

PATENT NO. : 5,148,284

DATED : September 15, 1992

INVENTOR(S) : T. NISHIKAWA et al.

It is certified that error appears in the above-indentified patent and that said Letters Patent is hereby corrected as shown below:

On the cover, [75] Inventors, change "Tomoyuki Nishikawa, Matsudo: Masahiro Kita, Tokyo: Takaaki Yano, Kawagoe: Tatsuya Yoshida, Shimooshi: Ryoji Honda, Hizaori, Kiyoshi Negishi, Tsurugashima: Tsutomu Sato, Tokyo: Shoji Kamasako, Tsurugashima, all of Japan" to ---Tomoyuki, Nishikawa, Chiba-ken: Masahiro Kita , Tokyo: Takaaki Yano, Tatsuya Yoshida, Ryoji Honda, Kiyoshi Negishi, all of Saitama-Ken: Tsutomu Sato, Tokyo: Shoji Kamasako, Saitama-Ken, all of Japan---.

On the cover, [56] U.S. Patents, please add the following documents:
4,640,880     2/87       Kawanishi et al.
3,909,258     9/75       Kotz
4,786,041     11/88      Acquaviva et al.

On the cover, Foreign Patent Documents, please add ---0104090 3/84 E.P.O.---.

At column 15, line 58 (claim 5, line 1) change "claiam" to ---claim---.

Signed and Sealed this

Third Day of October, 1995

Attest:

BRUCE LEHMAN

*Attesting Officer*    *Commissioner of Patents and Trademarks*